(12) United States Patent
Takada

(10) Patent No.: US 8,433,059 B2
(45) Date of Patent: Apr. 30, 2013

(54) ECHO CANCELLER CANCELING AN ECHO ACCORDING TO TIMINGS OF PRODUCING AND DETECTING AN IDENTIFIED FREQUENCY COMPONENT SIGNAL

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 748 days.

(21) Appl. No.: 12/656,397

(22) Filed: Jan. 28, 2010

(65) Prior Publication Data

US 2010/0226492 A1 Sep. 9, 2010

(30) Foreign Application Priority Data

Mar. 3, 2009 (JP) ................................. 2009-049665

(51) Int. Cl.
  *H04M 9/08* (2006.01)
(52) U.S. Cl.
  USPC ................................. 379/406.08; 379/406.03
(58) Field of Classification Search ............. 379/406.01, 379/406.08, 406.03, 406.02, 406.06
See application file for complete search history.

(56) References Cited

U.S. PATENT DOCUMENTS

| | | | |
|---|---|---|---|
| 6,563,803 B1 * | 5/2003 | Lee | 370/290 |
| 6,807,525 B1 | 10/2004 | Li et al. | |
| 7,711,107 B1 * | 5/2010 | Murgia et al. | 379/406.05 |
| 7,792,281 B1 * | 9/2010 | Zad-Issa et al. | 379/406.04 |
| 8,306,215 B2 * | 11/2012 | Takada | 379/406.08 |
| 2009/0129584 A1 | 5/2009 | Aoyagi et al. | |

FOREIGN PATENT DOCUMENTS

| | | |
|---|---|---|
| JP | 2000-295461 A | 10/2000 |
| JP | 2002101022 A | 4/2002 |
| JP | 2002237785 A | 8/2002 |
| JP | 2004-040589 A | 2/2004 |
| JP | 2007235874 A | 9/2007 |
| JP | 2007336364 A | 12/2007 |

OTHER PUBLICATIONS

"On sound quality evaluation: 5. Concept which forms the basis for loudness calculations" in technical report of Ono Sokki, on the website http://www.onosokki.co.jp/HP-WK/c_support/newreport/soundquality/soundquality_2.htm (revised Apr. 9, 2009), p. 6 of specification.
Japanese Office Action dated Feb. 14, 2013 with a partial English translation.

* cited by examiner

*Primary Examiner* — Olisa Anwah
(74) *Attorney, Agent, or Firm* — Rabin & Berdo, P.C.

(57) ABSTRACT

An echo canceller includes an initial delay estimator producing a reference signal containing an identified frequency component masked by means of frequency masking effect to output the reference signal on an echo path, and detecting, from a sending voice signal, an echo component of the identified frequency component derived from the reference signal. The estimator finds an initial delay amount on the echo path on the basis of a forming timing of the reference signal containing the identified frequency component and a detection timing of the echo component in the identified frequency component in the sending voice signal. The echo canceller includes a delay circuit for delaying a received voice signal by the initial delay amount on the echo path obtained from the estimator to supply a resulting signal to a pseudo echo generator.

12 Claims, 10 Drawing Sheets

ECHO CANCELLER CANCELING AN ECHO ACCORDING TO TIMINGS OF PRODUCING AND DETECTING AN IDENTIFIED FREQUENCY COMPONENT SIGNAL

BACKGROUND OF THE INVENTION

1. Field of the Invention

The present invention relates to an echo canceller, and more particularly to an echo canceller which may, for example, be incorporated in a personal computer.

2. Description of the Background Art

In recent years, IP (Internet Protocol) phones have become popular, which are based on the VoIP (Voice over Internet Protocol) to switch and convey voice signals on an IP network such as the Internet. For example, a kind of IP phone referred to as a softphone which is installed and operates on a personal computer (PC) has come into widespread use. The softphone uses a sound device that is on board the personal computer and may include an analog-to-digital (A/D) converter or a digital-to-analog (D/A) converter to input or output voice signals.

The processing by a conventional echo canceller using such a sound device will now be described below with reference to FIG. 2. Voice data coming from a distal-end talker, not shown, is sent over the Internet 100 to a network interface 114 provided in a network terminal device 115, such as a personal computer. The voice data is then decoded by a decoder 101 into a voice waveform signal, referred to below as a voice signal. The voice signal is inputted to a voice output driver 102, which then delivers an output signal to a storage buffer 104 provided for buffering, or absorbing the impact of, a voice break on a sound board 103 included in the network terminal device 115.

The break absorbing buffer 104 outputs the voice signals in the order of storage to a D/A converter 105. The D/A converter 105 converts the signals into corresponding analog signals, and then outputs the converted analog signals via a loudspeaker terminal 116 to a loudspeaker 106 and also to an A/D converter 108. The voice radiated from the loudspeaker 106 may be caught by a microphone 107 as depicted with a solid line 120 and thence supplied to the A/D converter 108 in the form of electric signals. The signals supplied to the A/D converter 108 include a signal component directly sent from the D/A converter 105. The signal component is inputted as a signal r(k) via another break absorbing buffer 109 to an adaptive filter 111 in a voice input driver 110.

On the other hand, the voice signal component coming from the loudspeaker 106 and supplied to the A/D converter 108 is inputted via the break absorbing buffer 109 to an adder 112. The adaptive filter 111 has the signal r(k) and a signal f(k) inputted to produce a cancellation signal or pseudo echo signal s(k). For producing the pseudo signal s(k), an adaptive algorithm that minimizes the signal f(k) may be used, such as a well-known NLMS (Normalized Least Mean Squares) algorithm. However, any suitable one of a variety of other adaptive algorithms that will minimize the signal f(k) may also be used.

The adder 112 sets off, or cancels; the signal component coming from the loudspeaker 106, i.e. an echo signal, with the pseudo echo signal s(k) to output a resulting signal f(k) to the adaptive filter 111 and an encoder 113. In order to transmit the voice signal on the Internet 100, the encoder 113 assembles the voice data into packets and outputs the resulting packets via the network interface 114 to the Internet 100.

Meanwhile, if the network terminal device 115 is a processor device, such as a personal computer, that executes a variety of processing other than communication processing, the echo canceller may suffer from undesirable situations.

Specifically, a general-purpose device, such as a personal computer, may execute various application programs, other than the processing requiring the real-time operation, such as communication, to use a variety of computer resources, for example, a CPU (Central Processing Unit) or memories. Therefore, the voice output driver 102 or the voice input driver 110 may sometimes temporarily refrain from processing.

Usually, such a hold back of the voice processing directly leads into interruptions of voice signals. To cope with this situation, in the conventional practice, voice data are stored in the break absorbing buffers 104 and 109, and during the voice processing being held back the voice data thus stored in the storage buffers 104 and 109 are outputted to the D/A converter 105 or the A/D converter 108, thereby preventing the voice breaks from occurring. Meanwhile, if the data stored in the storage buffers 104 and 109 has become depleted during the interruption, the voice data can no longer be outputted.

Conversely, even when the voice output driver 102 or the voice input driver 110 is in operation, the outputting of the break absorbing buffers 104 and 109 may be held back due to some causes. In this case, the storage buffers 104 and 109 still continue to receive data, but can nevertheless output no data, thus causing the data to continuously be stored so that the buffers may be saturated. During the saturation, if the storage buffers 104 and 109 are supplied with further data, such they cannot store the further data but render them discarded. Such data depletion or saturation in the break absorbing buffers 104 and 109 may lead to a phenomenon of the voice breaks in terms of voice signals.

In addition, such breaks in voice signals or fluctuations in storage volume of the break absorbing buffers 104 and 109 may lead to deterioration in performance of the echo reduction carried out with the use of the adaptive filter 111 for the following reasons.

Usually, the adaptive filter 111 for echo reduction, i.e. echo canceller, is installed so as to have its inputs interconnected to receive the outputs from the decoder 101 and the break absorbing buffer 109. Consequently, the signal path beginning with the voice output driver 102, passing through the break absorbing buffer 104, loudspeaker 106 and microphone 107, and extending through the break absorbing buffer 109 to the voice input driver 110 may involve fluctuation in storage volume or delay in, and voice breaks caused by the depletion or saturation of, the two break absorbing buffers 104 and 109, resulting in temporal fluctuation of the echo path.

As notorious, the adaptive filter 111 may be in full play on the presupposition that the echo path is temporally invariant. Therefore, in case the echo path undergoes temporally fluctuates, the performance of the adaptive filter is significantly deteriorated.

In the conventional echo canceller shown in FIG. 2, a signal outputted from the D/A converter 105 is directly supplied to the A/D converter 108, which in turn outputs a signal via the break absorbing buffer 109 to the adaptive filter 111. That is, the signal subjected to voice breaks, i.e. the buffer depletion or saturation, at the break absorbing buffer 109 is supplied to the adaptive filter as a reference input signal r(k). On the other hand, an echo signal, which has received the consequence of voice breaks, i.e. the buffer depletion or saturation, at the break absorbing buffer 109, is supplied to the adder 112.

In this way, the consequence of the break absorbing buffer 109 is taken into the input of the adaptive filter 111 as well to thereby allow the consequences of the break absorbing buffers 109 on the couple of paths for transmission and reception to be canceled out apparently. Thus, the adaptive filter 111 is not subject to temporal fluctuations on the echo paths, thereby preventing the capability of echo reduction from being deteriorated.

Incidentally, Japanese patent laid-open publication No. 2004-40589 discloses a hands-free talk device, wherein a reference signal outputted from a voice output driver is connected to an echo canceller via a buffer for received signal and a buffer for transmitting signal, and then a received signal passed through the buffers is acquired as the reference signal.

U.S. patent application publication No. US 2009/0129584 A1 to Aoyagi, et al., discloses an echo canceller, wherein delay time information on the delay characteristics of an echo path is obtained on the basis of a correlation between a smoothed received speech signal and a smoothed sending speech signal, update information indicating the execution or suspension of updating the tap coefficient of an adaptive filter is obtained on the basis of a received speech signal, a sending speech signal and the delay time information, and then, when the update information indicates the execution of the updating, an imitated echo generator performs the update of the tap coefficient and utilizes the delay time information as a reflection of the delay characteristic on the echo path.

Another Japanese patent laid-open publication No. 2000-295461 discloses a manner for calculating the highest power component from an input signal.

A conventional solution on an echo canceller may be referred to on the website, http://www.onosokki.co.jp/HP-WK/c_support/newreport/soundquality/soundquality_2.htm, Ono Sokki Technical Report "On Sound Quality Evaluation, Chapter 5. Concept Forming the Basis for Loudness Calculations", which the applicant noticed on Jan. 31, 2009.

However, in the conventional solution as shown in FIG. 2, since it is necessary to provide an interconnection from the loudspeaker 106 to the microphone 107 for echo reduction, it is necessary to use the dedicated sound board 103. Accordingly, the device on the whole tends to be costly.

If desired to dispense with such a dedicated board, the output from the loudspeaker 106 on one of the channels operated stereophonically needs to be connected by electrical wiring to the microphone terminal on the other channel. This may lead to a deficiency that the inherent stereo sound cannot be used. In addition, a further modification is necessary in which a reference signal for the echo canceller is sampled from a signal on the microphone side. It is however extremely difficult for the user to make such a modification from the perspective of both the hardware and the software.

These inconveniences are attributable to an abrupt change on the echo path. In this consideration, the inventor of the present application has proposed in the Aoyagi, et al., another solution to cope with these inconveniences, together with a co-inventor. With the proposed solution, the gross characteristics of a reference input signal and an echo signal, that is, the envelopes of the power of the reference input signal and the echo signal, are used to drive an adaptive filter, and an initial delay is adaptively estimated and the taps of the echo canceller are decided in order to track temporal changes from the initial delay.

However, in using the envelope characteristics, before data of a section have been secured such that the envelope of a voice signal represents the characteristics on how the voice waveform is, there is a possibility that the correlation cannot accurately be calculated. Because, in order to calculate a voice envelope that would inherently moderately fluctuate, time delay is unavoidably caused. Thus, if an abrupt change in delay occurs often on the echo path without any sign of prognostics, as in the case of a buffer in a personal computer described above, the envelope correlation cannot track such a change, with the result that the echo cannot be removed.

SUMMARY OF THE INVENTION

It is an object of the present invention to provide an echo canceller which is applicable to a general-purpose sound board and can quickly track and remove the echo even when the echo changes in delay in response to the buffering state of a break absorbing buffer, without specifically remodeling the hardware configuration.

In accordance with the present invention, an echo canceller comprises a pseudo echo generator including an adaptive filter for generating a pseudo echo signal on the basis of a received voice signal, and an echo canceling circuit for subtracting the pseudo echo signal from a sending voice signal to thereby remove the echo signal from the sending voice signal. The echo canceller further comprises an initial delay estimator for producing a reference signal containing an identified frequency component masked by means of the frequency masking effect to output the reference signal to an echo path and for detecting, from the sending voice signal, an echo component of the identified frequency component derived from the reference signal to find an initial delay amount on the echo path on the basis of a producing timing of the reference signal containing the identified frequency component and a detection timing of the echo component in the identified frequency component in the sending voice signal. The echo canceller further comprises a delay circuit for delaying the received voice signal by the initial delay amount on the echo path from said initial delay estimator to supply the resulting signal to said pseudo echo generator.

The echo canceller according to the echo canceller of the present invention can quickly tracks and remove an echo when the echo path even abruptly changes to affect the delay of the echo signal, without resulting in a specifically enlarged size of system.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
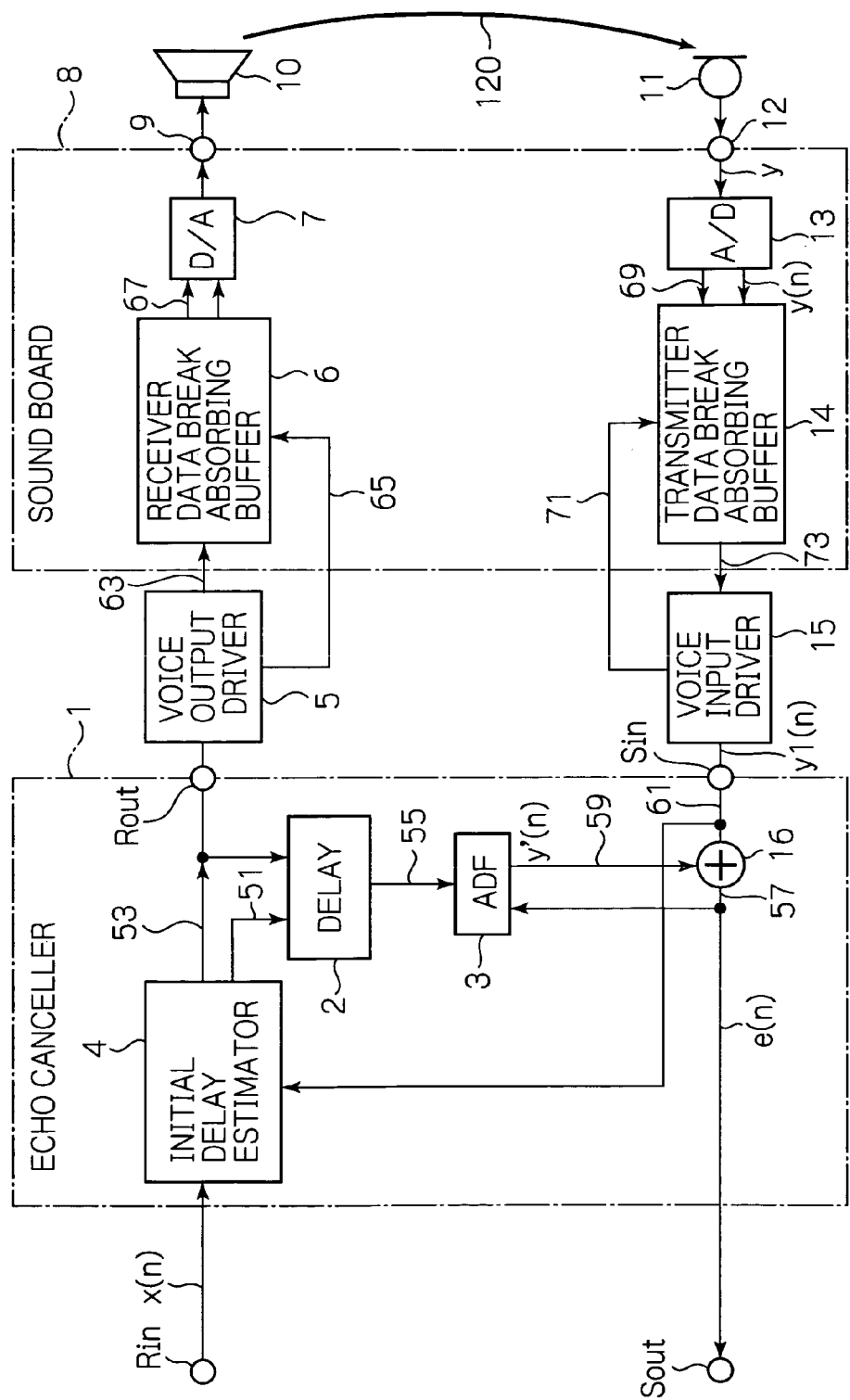
FIG. 1 is a schematic block diagram showing the configuration of an echo canceller and its peripheral components in accordance with an illustrative embodiment of the present invention.
Figure 2:
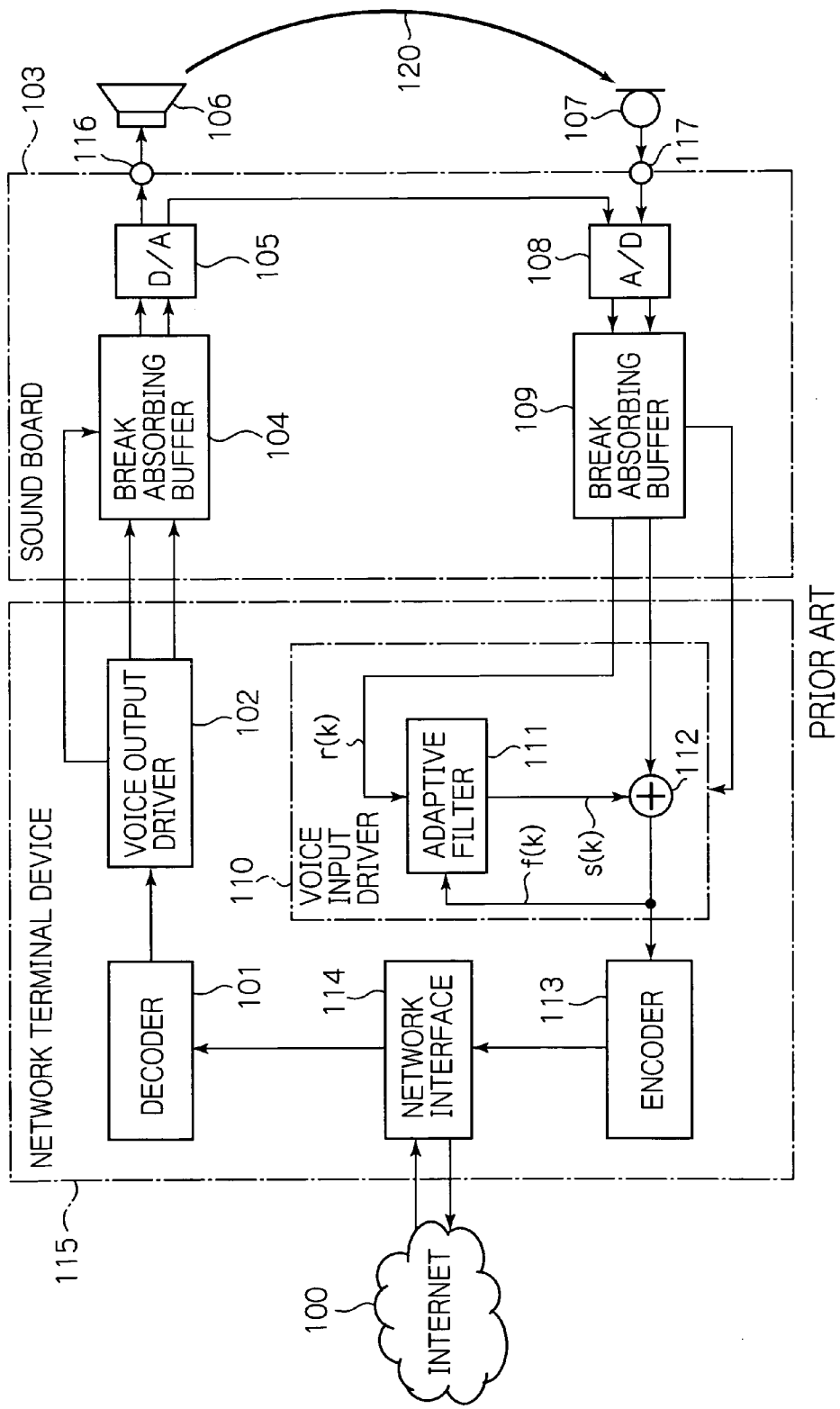
FIG. 2 is a schematic block diagram showing the configuration of a conventional echo canceller.

With reference to the accompanying drawings, preferred embodiments of an echo canceller in accordance with the present invention will be described in detail. FIG. 1 shows an illustrative embodiment in which the present invention is applied to an echo canceller 1 for use in, for example, a softphone, such as a hands-free talk device, installed on a personal computer, not shown, for canceling an echo by means of an adaptive filter provided.

The echo canceller of the illustrative embodiment may be arranged in the form of dedicated electronics board, for example. It may alternatively be implemented by a digital signal processor (DSP) having a program for echo cancellation installed, or by a processor system including a CPU and software for echo cancellation installed and executed by the CPU. In any of these cases, the echo canceller may be functionally depicted as shown in FIG. 1. That may also be the case with illustrative embodiments which will be described below. In this connection, the word "circuit" may be understood not only as hardware, such as an electronics circuit, but also as a function that may be implemented by software installed and executed on a computer.

FIG. 1 schematically shows the configuration of the echo canceller 1 together with its peripheral components. As depicted in the figure, the echo canceller 1 is interconnected to a sound electronics board 8 via a voice output driver 5 and a voice input driver 15. In the figure, the right hand is the side of a proximal-end user of the softphone, and the left hand is the side of a distal-end user to be connected to a telecommunications network, e.g. the Internet, not shown.

In the resent patent application, the word "user" is directed to a person who deals with a telephone terminal unit, such as a softphone, including an echo canceller in accordance with the present invention. The term "proximal end" refers to the location where the user stays, and the term "distal end" to a remote location where a party, or person, stays whom the user is connected to on the phone. In a broader sense, however, a party at the distal end may sometimes be referred also to a user. Such a user may sometimes be referred to as a "talker" when talking on the phone and also to a "listener" when listening to the other user.

Now, the echo canceller 1 includes a delay circuit 2, an adaptive filter (ADF) 3, an initial delay estimator 4 and an echo canceling adder 16 functioning as an echo component canceller for canceling an echo, which are interconnected as illustrated.

The echo canceller 1 has its receiver input terminal Rin connected to receive a digital voice signal decoded by a decoder, not shown. The echo canceller 1 also has its transmitter output terminal Sout connected to transmit a packet encoded by an encoder, not shown, over the telecommunications network to a distal-end user.

The sound board 8 includes a receiver data break absorbing buffer 6, a digital-to-analog (D/A) converter 7, a loudspeaker output terminal 9 connected to a loudspeaker 10, a microphone terminal 12 connected to a microphone 11, an analog/digital (A/D) converter 13 and a transmitter data break absorbing buffer 14, which are interconnected as depicted.

The initial delay estimator 4 is adapted to receive a received input signal x(n) on the terminal Rin and an echo signal y1($n$) on a transmitter side input terminal Sin and to be responsive to both signals to estimate an initial delay caused on the echo path to supply a resultant, estimated initial delay 51 to the delay circuit 2, where n is a natural number and represents a discrete time point. Signals are designated reference numerals of connections on which they are conveyed. The configuration of the estimator 4 will be set out later in more detail.

In the specification, the "initial delay on an echo path" means a delay encountered on a signal path formed from a receiver output terminal Rout to an input to the echo canceling adder 16, specifically via the voice output driver 5, the receiver data break absorbing buffer 6, the D/A converter 7, the loudspeaker output terminal 9, the loudspeaker 10, the microphone 11, the microphone terminal 12, the A/D converter 13, the transmitter data break absorbing buffer 14 and the voice input driver 15.

The delay circuit 2 serves as delaying the signal x(n) provided on a terminal 53 from the terminal Rin by an amount of delay 51 estimated by the initial delay estimator 4 to supply a resultant signal 55 to the adaptive filter (ADF) 3.

The adaptive filter 3 is connected to receive the signal 55, resultant from the signals x(n) delayed by the delay circuit 2, and a residual signal e(n) outputted on an output port 57 from the echo canceling adder 16, and is adapted to be responsive to these inputted signals to produce a pseudo echo signal y' (n) such as to progressively minimize the residual signal e(n) in electric power to develop the pseudo echo signal y' (n) on its output port 59 to the adder 16.

The echo canceling adder, or echo component canceller, 16 is adapted to subtract the pseudo echo signal y' (n) from a transmitter input signal 61 containing the echo signal y1($n$) supplied on the terminal Sin to output the residual signal e(n) substantially free of the echo component.

The voice output driver 5 is adapted to convey the signal provided from the terminal Rout from its output port 63 to the receiver data break absorbing buffer 6, while controlling the storage volume of the receiver data break absorbing buffer 6.

The receiver data break absorbing buffer 6 is controlled by the voice output driver 5 as depicted with a connection 65 to store data therein up to the controlled amount of storage and to output the stored data 67, when stored by the controlled amount, to the D/A converter 7 in the order the data was stored, namely first-in first-out (FIFO) order.

The D/A converter 7 functions as converting the digital data 67 from the receiver data break absorbing buffer 6 to a corresponding analog signal and outputs the resulting analog signal via the loudspeaker output terminal 9 to the loudspeaker 10.

On the transmitter side, the A/D converter 13 functions as receiving a voice signal captured by the microphone 11 on the microphone terminal 12 and converting the voice signal in the form of analog data to a corresponding digital signal to output the converted data 69 to the transmitter data break absorbing buffer 14.

The transmitter data break absorbing buffer 14 is controlled by the voice input driver 15 as depicted with a connection 71 to store data therein to a controlled amount, described later, and to output the stored data 73, when stored by the controlled amount, to the voice input driver 15 in the order the data was stored, that is, in a FIFO manner.

The voice input driver 15 is adapted to output the signal 73 supplied from the transmitter data break absorbing buffer, 14 on the terminal Sin, while controlling the amount of storage of the transmitter data break absorbing buffer 14.

A specific inner configuration of the initial delay estimator 4 will now be described with reference to FIG. 3. The initial delay estimator 4 of the illustrative embodiment includes a voice activity detector (VAD) 19, an identified frequency interrupter 17, a timing controller 1a, a delay decider 1b and a transmitter side identified frequency waveform regenerator 18, which are interconnected as depicted.

The identified frequency interrupter 17 includes a receiver side time/frequency converter 170 comprising a receiver side digital Fourier transform (DFT) circuit 172 for sole component, a data holder 171, a receiver side identified frequency component holder 173, a receiver side frequency/time converter 174 comprising a receiver side inverse digital Fourier transform circuit 175 for sole component and an inverse DFT normalizer 176, a switch 177, and an adder 178 for canceling a pure tonal component, or pure tone canceller, which are interconnected as illustrated.

The transmitter side identified frequency waveform regenerator 18 includes a transmitter side time/frequency converter 180 comprising a transmitter side digital Fourier transform circuit 181 for sole component, a transmitter side identified frequency component holder 182, and a transmitter side frequency/time converter 184 including a transmitter side inverse digital Fourier transform circuit 183 for sole component, which are interconnected as depicted.

The initial delay estimator 4 of the illustrative embodiment functions, as mentioned above, as determining an initial delay encountered on the echo path. The fundamental concept to determine an initial delay on the echo path will now be described.

The initial delay estimator 4 is arranged to determine an initial delay on the echo path in terms of taking account of the frequency masking effect in the human auditory system, as set out below. Briefly, the frequency masking effect is caused when a frequency component in the vicinity of a stronger frequency component is masked from the human hearing sense so that the masked frequency component is insensible. As to further details of the frequency masking effect, reference is made to, for example, Ono Sokki Technical Report referred to in the introductory part of the present specification.

The frequency masking effect involves a further interesting property. That is, if a somehow extremely stronger frequency component is involved as mentioned above, then the masking effect is more likely to appear on the side higher in frequency than the stronger frequency component. This implies that a sound signal having its frequency component not flat but irregular in strength behaves as if a frequency component residing in the vicinity of, and slightly higher than, the stronger component did not exist psychoacoustically.

The initial delay estimator 4 of the illustrative embodiment thus takes account of the frequency masking effect. Specifically, the identified frequency interrupter 17 selects a single tonal frequency residing between a frequency of 1 kHz or in its vicinity, the first peak, and a frequency of 2 kHz or in its vicinity, a second peak, of the human voice in a sound signal in order to take advantage of that frequency component signal, which the human cannot sense due to the frequency masking effect. This frequency component signal may be referred to as a delay estimation reference signal.

The identified frequency interrupter 17 is adapted for interruptedly removing a normal, audible frequency component, i.e. an identified, or specific, frequency component in the audible band, to thereby produce a reference signal x_ref(n) on the output port Rout. Since the single identified frequency component in the audible band is thus used for estimating an initial delay, there is no necessity of particular hardware interconnection or remodeling.

The delay estimation reference signal x_ref(n), as an identified frequency component, is radiated from the loudspeaker 10 as a sound, which is caught by the microphone over part of the echo path coupled acoustically. Consequently, the terminal Sin receives the signal y1(n) including the identified frequency component corresponding to the delay estimation reference signal.

The transmitter side identified frequency waveform regenerator 18 is adapted to receive the echo signal y1(n) on the terminal Sin to regenerate the identified frequency that may be contained in this echo signal y1(n) to deliver the regenerated frequency 75 to a delay amount decider 1b.

The delay amount decider 1b is adapted to find out a time point txoff at which the delay estimation reference signal x_ref(n) abruptly falls, or goes negative, in signal level, and to detect the signal level of an identified frequency component corresponding to the delay estimation reference signal contained in the echo signal to find out a time point tyton at which the level going positive is detected, then finding the amount of initial delay Tid' on the echo path from a difference between the time points txoff and tyton to output the found amount of initial delay to the delay circuit 2, FIG. 1. This allows the delay circuit 2 to compensate the delay part Tid' by the delay estimation reference signal for the adaptive filter 3 so that the adaptive filter 3 will not be influenced by fluctuations in the initial delay amount.

The initial delay estimator 4 of the illustrative embodiment also has a pure tonal component canceling adder 178 provided in the identified frequency interrupter 17. The pure tonal component canceling adder 178 functions as inverting and adding to the voice signal an identified frequency component, such as the i'th frequency component, produced by digital Fourier transform or digital inverse Fourier transform at a single frequency to thereby cancel only the identified frequency component from the voice signal, where i is a natural number.

In order to remove or extract such a single frequency, it is usually required to use a digital band rejection filter, such as an FIR (Finite Impulse Response) or IIR (Infinite Impulse Response) filter, operated with an enormous number of orders.

With the illustrative embodiment, however, the pure tonal component canceling adder 178 is arranged to cancel out a single frequency component from a voice signal. Accordingly, the single frequency component may ideally be removed or extracted just by means of simple multiplication of complex triangular functions and subtraction of a temporal waveform without using band processing filters with a larger number of orders as conventionally required. Moreover, the illustrative embodiment is superior not only in frequency selectivity but also in reduction of operational costs to the conventional solutions.

In operation, a signal x(n) supplied on the terminal Rin is inputted to the echo canceller 1. A signal outputted from the terminal Rout of the echo canceller 1 is supplied via the voice output driver 5 to the received data break absorbing buffer 6.

If the general-purpose device, such as a personal computer, on which the softphone is installed, is at this time executing a program having its execution priority higher than that of voice processing, then the voice output driver 5 is rendered to its stand-by state. Thence, the data x(n) is not outputted from the port 63 to the received data break absorbing buffer 6.

During this period of time, data already stored in the received data break absorbing buffer 6 is outputted to the D/A converter 7. Accordingly, while the voice output driver 5 thus produces no output, the absorbing buffer 6 outputs the voice data stored to the loudspeaker 10 in order that the loudspeaker 10 apparently continues to produce the voice sound. If no received data is provided and the received data break absorbing buffer 6 has completely become destitute of data stored, then no voice sound is developed from the loudspeaker 10.

However, when the voice output driver 5 has recovered from its stand-by state, the voice signal x(n) is outputted, sooner or later, from the loudspeaker 10 even being subjected to appreciable delay. The prevailing phenomenon is "voice delay" or "voice intermission".

By contrast, if the D/A converter 7 is caused to refrain from conversion by some reason, the received data break absorbing buffer 6 is filled up to its storage capacity. If the storage buffer 6 has become saturated, it is no longer able to store the data outputted from the voice output driver 5. The overflown data is discarded without being outputted from the loudspeaker 10. That is, the prevailing state is the "voice drop or lost" state.

Thus, the received data break absorbing buffer 6 stores data and outputs the stored data so as to avoid the depletion of the data voice signal to the utmost extent possible. More specifically, the received data break absorbing buffer 6 temporarily stores an amount of data which is controlled in response to the control signal 65 provided from the voice output driver 5, and then outputs the voice signals 67 to the D/A converter 7 in the order the voice signals are stored therein.

The D/A, converter 7 converts the digital voice signal 67 into a corresponding analog signal, which is then outputted to the loudspeaker 10 via the loudspeaker output terminal 9. The loudspeaker 10 radiates the voice represented by the signal to an ambient sphere.

Part of the voice signal, which is radiated from the loudspeaker 10 into the ambient sphere, is caught by the microphone 11 as an echo. The microphone 11 produces the echo in the form of analog echo signal y, which is in turn supplied via the microphone terminal 12 to the A/D converter 13 where it is converted into a corresponding digital signal y(n).

The digitized signal y(n) is outputted to the transmitter data break absorbing buffer 14, which then stores the signal or data so as to avoid breaks in the voice signal of the data.

On the side of the microphone 11, a situation may sometimes occur which is similar to that on the loudspeaker side. Therefore, the operation on the on the side of the microphone 11 will now be described.

In case the general-purpose device, i.e. the personal computer on which the softphone is installed, is to execute a program higher in priority than the voice processing, the A/D converter 13 remains unable to output data to the transmitter data break absorbing buffer 14, and thus stays in its stand-by state.

During this time, data already stored in the transmitter data break absorbing buffer 14 is outputted to the voice input driver 15. Thus, there is no output from the A/D converter 13, but voice data is outputted from the absorbing buffer 14 to the voice input driver 15 so that the voice is not interrupted apparently. When the received data is interrupted and the transmitter data break absorbing buffer 14 has completely become depleted of data, then there is no voice data outputted.

When the voice output driver 5 has recovered from its stand-by state, the voice signal will be outputted sooner or later from the loudspeaker 10 although delayed appreciably. The prevailing phenomenon is "voice delay" or "voice intermission".

However, if the voice input driver 15 is brought into its stand-by state by some reason, then the transmitter data break absorbing buffer 14 is unable to output data. Accordingly, the storage of the transmitter data break absorbing buffer 14 is filled up to its full capacity. If the transmitter data break absorbing buffer 14 has become saturated, it is no longer able to store the data outputted from the A/D converter 13. The overflowing data will be discarded without being outputted to the voice input driver 15. The prevailing state is thus the "voice drop or lost" state.

In order to avoid the occurrence of such voice drop or delay to the utmost extent possible, the storage capacity of the transmitter data break absorbing buffer 14 and the received data break absorbing buffer 6 is properly set beforehand by a designer of the network terminal.

As described above, the transmitter data break absorbing buffer 14 stores an amount of data under the control of the control signal 71 from the voice input driver 15 in order to prevent voice drop to the utmost extent possible. The storage buffer then outputs the voice data to the voice input driver 15 in the order the data was stored.

Now, the voice input driver 15 outputs the echo signal y1(n) through the terminal Sin to the echo canceling adder 16. The adder 16 then cancels out the output y' (n) of the adaptive filter 3 from the echo signal y1(n). If the k'th data is treated, the echo canceling adder 16 cancels out the output y' (k) from the echo signal y1(k), where k is a natural number and represents the order of data to be treated with.

The output e(n) of the echo canceling adder 16 is delivered to the adaptive filter 3. The adaptive filter 3, when receiving the signal x(n) and the residual signal e(n), produces a pseudo echo signal y' (n) so that the power of the signal e(n) will be progressively smaller. There may be a variety of methods applicable to producing the pseudo echo signal y' (n). For example, a method may be applied that uses a coefficient updating algorithm, such as a known learning identification method. However, any suitable algorithm may widely be applied that provides for the minimum power of e(n).

The output of the echo canceling adder 16 is developed on the terminal Sout, which will be encoded by an encoder, not shown, to be transmitted to the distal-end user.

In the echo canceller 1, the initial delay estimator 4 receives a signal x(n) on the terminal Rin and the echo signal y1(n) on its other terminal 61. The initial delay estimator 4 is responsive to the signal x(n) and the echo signal y1(n) to estimate an initial delay on the echo signal path. The operation of the initial delay estimator 4 will now be described with reference to FIG. 3.

The initial delay estimator 4 uses the signals x(n) and y1(n) to calculate an initial delay on the echo path, as will be described subsequently.

Initially, the voice signal x(n) from the distal-end talker is inputted to the voice activity detector (VAD) 19 and the identified frequency interrupter 17.

The voice activity detector 19 decides whether or not the input signal x(n) is vocal. In order to detect a voice, a short-term average value x_short(k) and a long-term average value x_long(k) of the absolute signal value |x(n)| are calculated by means of, for example, the following expressions (1) and (2), respectively:

$$x\_short(k)=(1.0-\delta s)\cdot x\_short(k-1)+\delta s\cdot |x(n)| \quad (1)$$

$$x\_long(k)=(1.0-\delta l)\cdot x\_long(k-1)+\delta l\cdot |x(n)| \quad (2)$$

where $0<\delta s \leq 1.0$ $0<\delta l \leq 1.0,$ the suffix l being a lower case letter of L, the vertical bars representing "the absolute value of".

The voice activity detector 19 decides the state of "voice detected" in case the condition of the expression (3) is met:

$$x\_short(k) \geqq x\_long(k) + VAD\_m (dB) \quad (3)$$

The expressions utilize constants δs and δl defining an average follow-up or tracking speed. If the constants δs and δl are larger, the system is more sensitive to temporal fluctuations, but it is susceptible to the effect of a background noise. If the constants δs and δl are smaller, the system follows gross components, while becoming dull to noise.

In those expressions, it is noted that the letter k denotes the sequential order of calculation. As far as the expressions (1) (2) and (3) are concerned, the variable k may be the same in timing as another variable n representing the order of sampling. In this case, the variable k in the expressions (1) (2) and (3) may be considered as the variable n. That is, the timing may be the same as the sampling sequence. It is noted that, except for the expressions (1) (2) and (3), the variable k differs in meaning from the variable n unless otherwise stated.

In the illustrative embodiment, as the constant δs, a constant value equivalent to 20 milliseconds in terms of time is used while, as the constant δl, a constant value equivalent to 5 seconds is used, and, as a member VAD_m, a threshold value equivalent to 6 dB is used.

Thus, the expression (3) may, if not expressed in dB, be rewritten into a normal expression:

$$x\_short(k) \geqq x\_long(k) \times VAD\_mlin \quad (3)$$

where VAD_mlin is 2.0.

The meaning of this expression is the same as the expression defined in dB.

With the specific voice activity detector 19, a voice component is detected in the manner described above. However, any other suitable method may be applied to the voice activity detector 19 if it can detect a voice component involved in a sound signal.

Upon detecting a voice, the voice detector or the voice activity detector 19 outputs a voice detection signal V to the timing controller 1a. The timing controller 1a causes a switch 177 to be turned on or off at a timing which will subsequently be described.

The voice signal x(n) from the distal end is supplied to the identified frequency interrupter 17 on the terminal Rin. Initially, the signal x(n) is outputted to the data holder 171 and the receiver side time/frequency converter 170.

In the receiver side time/frequency converter 170, the digital Fourier transform (DFT) circuit 172 takes out only an identified frequency component in a manner as described below.

For ease in understanding, the case of processing a single frequency is taken for illustration and the common digital Fourier transform (DFT) will now be described.

The digital Fourier transform is a method already used in many signal processing techniques. It is most familiar as a method for transforming a signal in the time domain into a signal in the frequency domain and vice versa. The digital Fourier transform, transforming a waveform on the time domain into another waveform on the frequency domain, may be expressed by the expression (4):

$$X(m) = \sum_{k=0}^{N-1} x(k) e^{-j2\pi km/N} \quad (4)$$

where m is an integer from 0 to (N−1), N being a natural number. On the other hand, the inverse digital Fourier transform, transforming the waveform on the frequency domain into the former waveform on the time domain, is expressed the expression (5):

$$x(n) = \frac{1}{N} \sum_{m=0}^{N-1} X(m) e^{j2\pi nm/N} \quad (5)$$

where n is an integer from 0 to (N−1).

The right side of the expression (4) denotes that an m'th component on the frequency domain is calculable, while the right side of the expression (5) denotes that an n'th component on the time domain is calculable. The letter j denotes the processing on complex numbers. In the expression (5), a coefficient 1/N is a constant value with which the original temporal waveform may be reproduced when inversely transformed. In FIG. 3, the inverse DFT normalizer 176 takes charge of this processing.

In the illustrative embodiment, the expression (5) includes the division by N. However, since the domain transform of the expression (4) is the same as the expression (5), that is, both the transforms are reversible from each other, the system may be designed such as to calculate the value of √/N, i.e. $N^{1/2}$, in both the digital Fourier transform and the inverse digital Fourier transform to carry out multiplication by 1/√N in the expression (5). Thus, since the transform is reversible, the inverse digital Fourier transform of the frequency components, once transformed by digital Fourier transform, provides the original waveform on the time domain.

It is noted that, in the illustrative embodiment, only the i'th components of the expressions (4) and (5) are restrictively used. More specifically in the illustrative embodiment, only the i'th component is digital Fourier transformed, and then inversely digital Fourier transformed. That is accomplished by the digital Fourier transform circuit 172 for sole component on the receiver side executing the expression (6) and the receiver side frequency/time converter 174 executing the expression (7):

$$X(i) = \sum_{k=0}^{N-1} x(k) e^{-j2\pi ki/N} \quad (6)$$

While:

$$x'(n) = \frac{1}{N} \sum_{m=i}^{i} X(m) e^{j2\pi nm/N} \quad (7)$$

where n is an integer from 0 to (N−1).

More specifically, the receiver side DFT circuit 172 for sole component executes the expression (6) only on one of data of N successive samples, i.e. M=0 to (N−1), the one data being correspondent to the i'th frequency component when M=i, i.e. the data x(i), in a manner different from the expression (5).

The i'th frequency component x(i), which is a result from the calculation by the receiver side DFT circuit 172 for sole component, is retained by the identified frequency component holder 173.

As regards how to select the i'th component, namely, to set the value of i, the value of i may be selected from a range from 1 kHz, which stands for the first peak of the human voice, to 2 kHz, which stands for its second peak, inclusive, and its vicinity. For example, in the illustrative embodiment, 1.6 kHz is used as the i'th peak, only in a non-limiting way. The illustrative embodiment has its sampling frequency set to 16 kHz and the number of samples N set to 10.

The identified frequency component holder 173 outputs data x(i) of the i'th component to the receiver side frequency/time converter 174. The converter 174 then executes the expression (7).

In the receiver side frequency/time converter 174, the receiver side inverse DFT circuit 175 for sole component executes inverse transform from the frequency domain, i.e. the inverse digital Fourier transform, only on the frequency component x(i) provided from the identified frequency component holder 173 to regenerate a temporal waveform corresponding to N samples.

From the expression (7), it can be seen that a waveform regenerated by inverse transform from the frequency domain is a signal having the i'th frequency component, that is, a signal having an unmixed i'th frequency component obtained by the digital Fourier transform on the voice signal, i.e. a tonal waveform for the i'th component. In short, in the process of the expressions (6) and (7), only the i'th frequency component included in the voice signal is extracted and restored to a temporal waveform.

The output x'(n) from the receiver side frequency/time converter 174 is provided to the switch 177. The switch 177 is opened or closed under the control of the timing controller 1a at the timing described below.

Upon receipt of the voice detection signal V from the voice activity detector 19, the timing controller 1a increments a counter, not shown, included therein. For the period corresponding to initial N samples beginning with the voice detection, the timing controller 1a outputs to the switch 177 a signal Son, which in turn causes the switch 177 to be closed. Otherwise, the timing controller 1a does not output the signal Son.

The switch 177 is responsive to the signal Son provided from the timing controller 1a to close itself to thereby allow the signal to pass from the receiver side frequency/time converter 174 to the pure tonal component canceling adder 178. For a period corresponding to the next N samples following thereto, no signal is outputted from the timing controller 1a.

Preferably, the period corresponding to the N samples may be set to a length of time during which a voice signal may be regarded as a steady-state signal. For instance, it is preferable set this period to a time length in the order of 10 to 30 milliseconds.

When the timing controller 1a does not output the signal Son, the switch 177 is opened.

After the period corresponding to the initial N samples is over, the timing controller 1a causes the switch 177 to be opened for the next N-sample period following thereto.

The timing controller 1a repeats the above sequence of operation as long as the voice signal is detected while controlling the switch 177.

To the pure tonal component canceling adder 178, the output x' sw(n) from the switch 177 is supplied. The output xh(n) from the data holder 171 is also supplied to the pure tonal component canceling adder 178.

The pure tonal component canceling adder 178 adds the output x' sw(n) from the switch 177 to the output xh(n) from the data holder 171. The output of the pure tonal component canceling adder 178 is developed on the terminal Rout.

The data holder 171 holds the input signal x(n) coming from the distal-end talker for a certain time length, e.g. for a time period corresponding to N samples, thereby delaying the signal.

This time period may be set to correspond to N samples which are the number of samples for digital Fourier transform. Because, when the pure tonal component canceling adder 178 adds the voice signal waveform itself to the i'th component extracted waveform x'(n), both waveforms need to be brought into coincidence in timing with each other.

The output of the pure tonal component canceling adder 178 is developed on the terminal Rout. The output signal on the terminal Rout is converted by the D/A converter 7 into a corresponding analog signal, and then radiated from the loudspeaker 10 in the form of sound, reaching the proximal-end listener, not shown. Part of the output sound radiated may be caught by the microphone 11 via the acoustic coupling 120 so as to be transduced into an echo signal y.

The echo signal y supplied from the microphone 11 is converted by the A/D converter 13 into a corresponding digital signal, and then supplied via the transmitter data break absorbing buffer 14 and the voice input driver 15 to the terminal Sin of the echo canceller 1 as the signal y1(n).

The signal from the terminal Sin is supplied to the transmitter side identified frequency waveform regenerator 18 of the initial delay estimator 4.

In the transmitter side identified frequency waveform regenerator 18, the DFT circuit 181 extracts only the i'th frequency component from the echo signal y1(n) by way of signal regeneration, in the same way as in the receiver side, in accordance with the following expression (8):

$$Y1(i) = \sum_{k=0}^{N-1} y1(k)e^{-j2\pi ki/N} \qquad (8)$$

It is crucial to set the extracted i'th frequency component so as to be the same component as the i'th frequency component selected on the receiver side.

The signal y1(i) regenerated by the DFT circuit 181 is outputted to, and then held by, the transmitter side identified frequency component holder 182.

The output of the transmitter side identified frequency component holder 182 is inversely digital Fourier transformed by the inverse DFT circuit 183 into a temporal waveform yt(n), in the same way as in the receiver side, in accordance with the following expression (9):

$$yt(n) = \frac{1}{N} \sum_{m=i}^{i} Y1(m)e^{j2\pi nm/N} \qquad (9)$$

The signal yt(n) obtained on inverse digital Fourier transform by the inverse DFT circuit 183 is outputted to the delay amount decider 1b.

The delay amount decider 1b, responsive to a timing signal T from the timing controller 1a, estimates the initial delay on the echo path under the control of the timing controller 1a.

Figure 4:
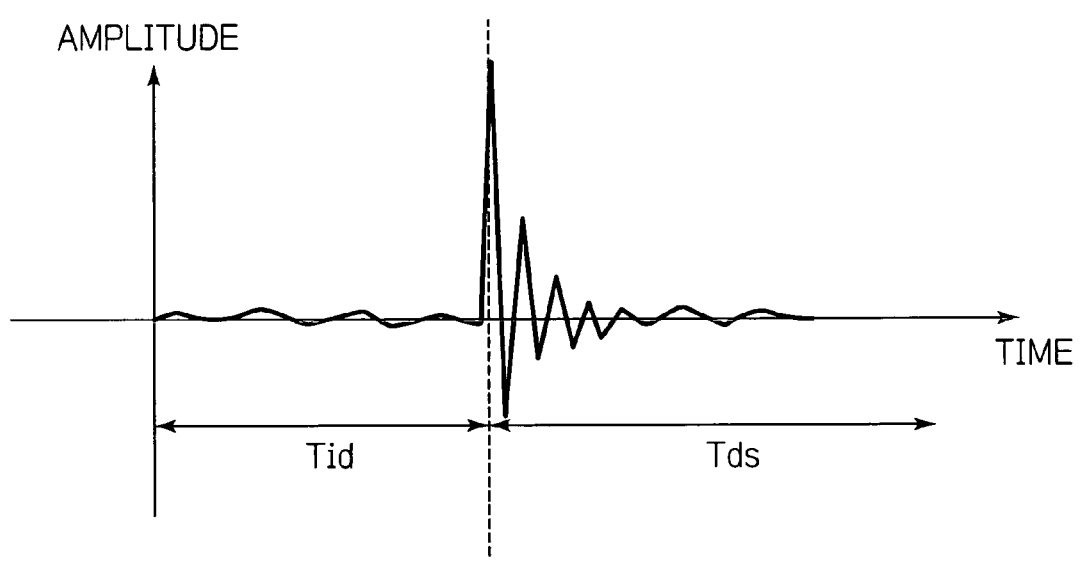
FIG. 4 is a graph plotting impulse responses on an echo path.

Referring to FIG. 4, now, which is a graph plotting the impulse responses on the echo path, the temporally earlier section on the echo path involves the smaller amplitude of the impulse response, while the amplitude takes its maximum at time Tid. After this time Tid, the amplitude of the impulse response becomes progressively smaller with lapse of time so that the scattering response continues for the period of time Tds.

The delay amount decider 1b manages the delay circuit 2 in such a manner that the initial delay time section Tid shown in FIG. 4 is substantially equal to an amount of delay introduced by the delay circuit 2. That prevents the decider 1b from allocating coefficients to the filter, not shown, included in the adaptive filter 3, thereby the adaptive filter 3 not being disturbed by fluctuations in initial delay.

Figure 5:
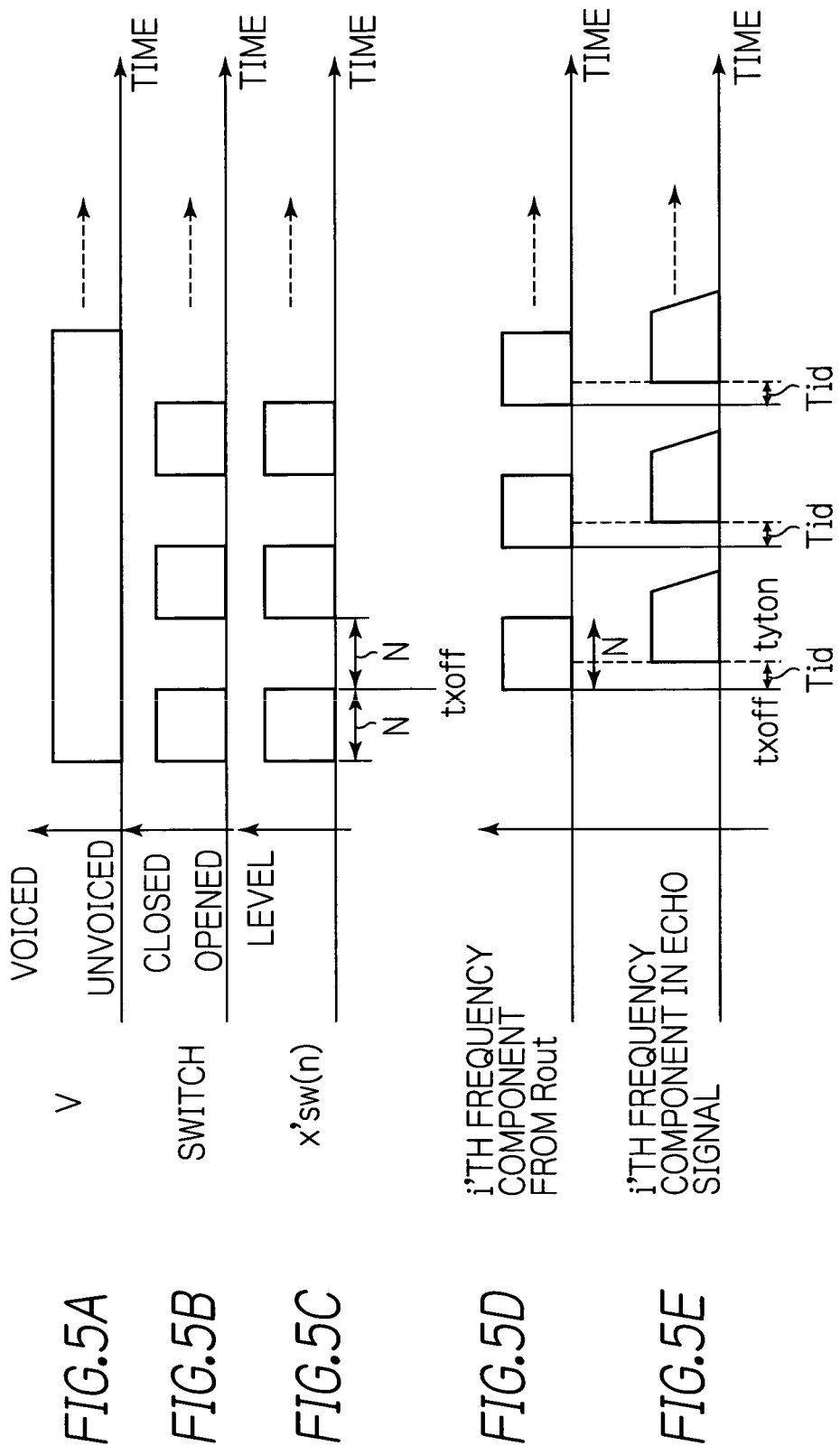
FIG. 5 is a timing chart useful for understanding the amounts of delay estimated by the delay amount decider shown in FIG. 3.

FIG. 5 is a timing chart useful for understanding how the amount of delay is estimated by the delay amount decider 1b. The first line (A) of FIG. 5 depicts the sound detection signal V produced by the voice activity detector 19. To the delay amount decider 1b, the timing signal T is supplied from the timing controller 1a. The second line (B) shows the timing for opening and closing the switch 177.

The third line (C) of FIG. 5 shows the level of the signal x' sw (n) inputted to the pure tonal component canceling adder 178. Referring to the lines (B) and (C), if the switch 177 is closed, or disconnected, the delay amount decider 1b receives from the switch 177 the output x' sw(n) of the receiver side frequency/time converter 174. This output from the switch 177 is a tonal signal having the i'th frequency component, as set forth above.

If the switch 177 is closed, or conductive, the pure tonal component canceling adder 178 subtracts the i'th component from the voice signal. Consequently, the voice signal outputted from the pure tonal component canceling adder 178 does not include the i'th frequency component x(i). Therefore, the i'th frequency component is not contained in the echo signal y coming from the sound converted from the delay estimation reference signal in the time domain and radiated by the loudspeaker 10.

However, since during the next N-sample period the switch 177 is opened, see the line (B) of FIG. 5, the i'th component is not subtracted from the voice signal in the pure tonal component canceling adder 178. Resultantly, the i'th frequency component will be contained in the echo signal as well, see the fourth line (D). The line (D) shows the level of the i'th frequency component included in the voice signal outputted from the terminal Rout. The fifth line (E) shows the level of the i'th frequency component included in the echo signal.

Thence, the delay amount decider 1b detects the presence of the i'th frequency component contained in the echo signal to find out the amount of delay in the fashion as read below.

Initially, the delay amount decider 1b detects the i'th frequency component from an output yt(n) of the transmitter side identified frequency waveform regenerator 18. The method for this detection may be similar to that applied to the voice detection by the voice activity detector 19.

The delay amount decider 1b detects the i'th frequency component from the signal x' sw(n) supplied from the switch 177. The method for this detection may also be similar to the method for voice detection by the voice activity detector 19.

The delay amount decider 1b calculates the time Tid' that elapses from the time txoff at which the switch 177 ceases the detection output of the signal x' sw(n), the line (C), to the time tyton, at which the signal yt(n) from the transmitter side identified frequency waveform regenerator 18 is detected. The delay amount decider 1b outputs the time Tid' to the delay circuit 2 as a delay amount.

As regards the method to find the initial delay amount Tid' on the echo path, the delay amount decider 1b may be arranged to determine a difference between a time at which the signal x' sw(n) from the switch 177 abrupt drops in level or electric power and a time at which the i'th frequency component signal extracted from the echo signal abruptly increases in level or electric power to use the resultant difference as the initial delay Tid'.

As another method, the delay amount decider 1b may be adapted to determine a difference between a time at which the switch 177 transits from its closed state to its open state and a time at which the identified frequency signal extracted from the echo signal abruptly ascends in level or power to use the resultant difference as the initial delay Tid'.

The delay circuit 2, FIG. 1, then delays the signal x(n) by the period of time corresponding to the number of samples corresponding to the amount of delay Tid' to output the delayed signal 55 to the adaptive filter 3.

The adaptive filter 3 utilizes the signal 55, corresponding to x(n) delayed by the delay circuit 2, the echo signal y1(n) and the residual signal e(n) for producing the pseudo echo signal y' (n) by means of an NMLS (Normalized Least Mean Square) algorithm as known per se. It is noted that any suitable one of echo estimation algorithms may advantageously be applied provided that the algorithm used provides for echo estimation.

In summary, the illustrative embodiment utilizes the acoustic masking effect, so that a delay estimation reference signal for initial delay estimation is outputted from the loudspeaker to be caught by the microphone as an echo signal, from which the echo component of the identified frequency component coming from the delay estimation reference signal and insensible to the proximal-end listener due to the frequency masking effect may be taken out from the echo signal to the microphone. The initial delay on the echo path may then be determined on the basis of the timing of generating the delay estimation reference signal or reducing the component of the delay estimation reference signal and the timing of detecting from the echo signal the identified frequency component signal derived from the delay estimation reference signal in order to compensate for the amount of delay. Such an echo canceller may thus be provided in which the adaptive filter is not disturbed by the transform operation of the initial delay.

In addition, with the illustrative embodiment, the initial delay decider may promptly track or follow a change in the initial delay on the echo path when the initial delay fluctuates to thereby delay the portion not in need of delay. It is thus possible to absorb fluctuations caused in storing voice data in the break absorbing buffers. The adaptive filter is hence allowed to make estimation only on the portion corresponding to the echo path other than the fluctuating initial delay portion, that is, the time-invariant portion, thereby promptly removing the echo signal despite fluctuations caused, for example, in the break absorbing buffers.

Moreover, with the illustrative embodiment, the temporal signal x' (n) composed only of a single i'th frequency component is generated by digital Fourier transform or inverse digital Fourier transform at the single frequency, the signal x' (n) is added to a voice signal by the pure tonal canceling adder to thereby cancel out only the identified frequency component from the signal. Therefore, without providing band filters of higher orders, a single frequency component may be removed or extracted just by simple multiplication of complex triangular functions and subtraction of a temporal waveform, thus remarkably reducing the cost for calculations.

Now, an alternative embodiment of an echo canceller of the present invention will be described with reference to FIG. 6.

In the specification and accompanying drawings, like components are designated with the same reference numerals and symbols. Hence, a repetitive description on like elements is dispensed with. The alternative embodiment is directed to such a case in which the echo canceller is applied to an acoustic echo canceller for use in a hands-free talk device. In such a case, the initial delay portion on the echo path may frequently change by mechanical operations of the personal computer on which the echo canceller is installed without exhibiting any signs of prognostics, thus the amount of delay changing very abruptly.

In practice, there are a variety of causes for changing on the echo path in addition to the above mentioned changes in the delay amount. For example, in the acoustic echo path, incidental movements of the body of a proximal-end speaker on the phone need to be taken into account because the proximal-end speaker, while talking over the hands-free telephone, may usually move his or her body from time to time, in response to which the scattering response time part on the echo path may often fluctuate on occasions. The alternative embodiment is arranged with that fact taken into consideration.

Figure 6:
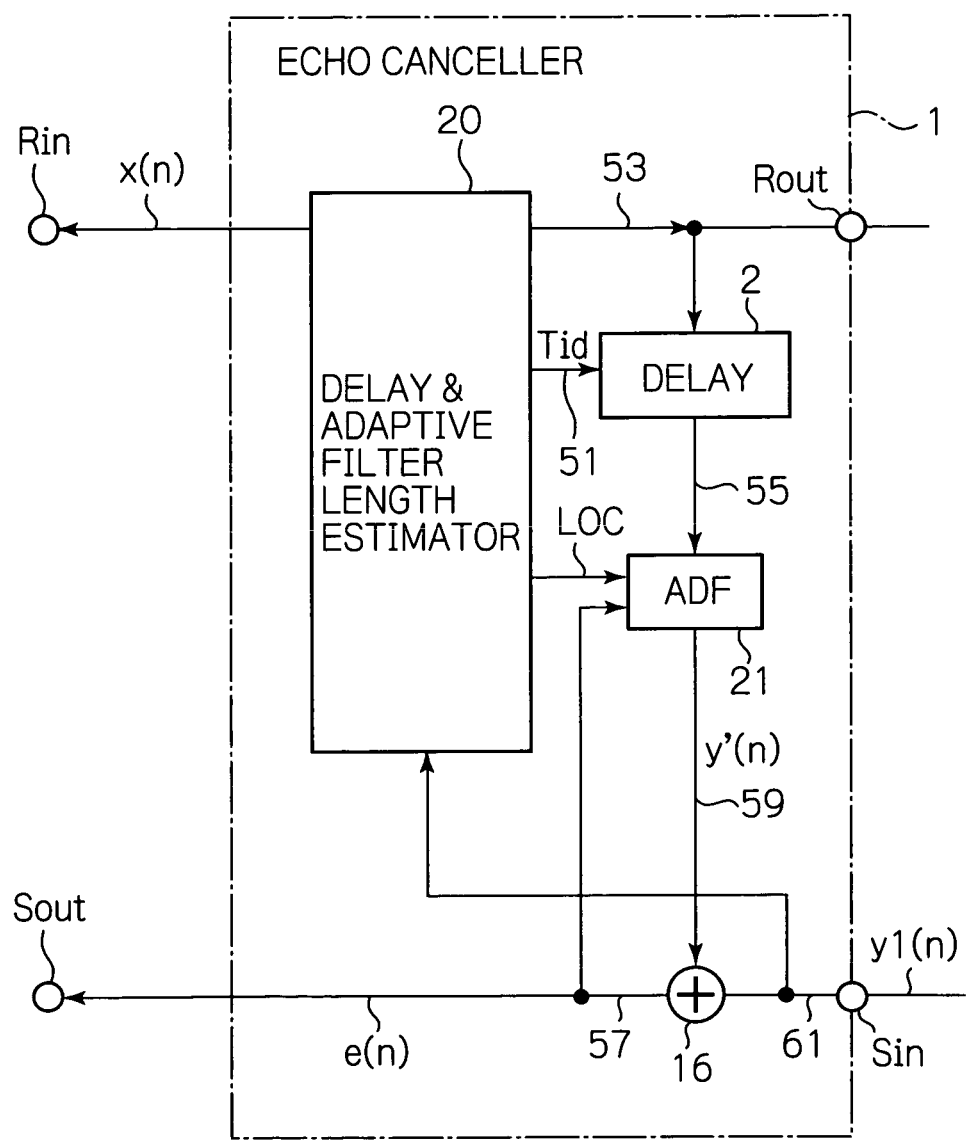
FIG. 6 is a schematic block diagram showing the configuration of an echo canceller in accordance with an alternative embodiment of the present invention.

FIG. 6 shows the configuration of the echo canceller according to the alternative embodiment. The alternative embodiment may be the same as the illustrative embodiment shown in and described with reference to FIGS. 1 and 3 except for including a delay and adaptive filter length estimator 20 in place of the initial delay estimator 4 and an adaptive filter 21 in place of the adaptive filter 3. The terminals Rout and Sin are interconnected to the voice output driver 4 and the voice input driver 15, FIG. 1, respectively.

The delay and adaptive filter length estimator 20 is adapted to receive the signal x(n) and the echo signal y1(n) from the input terminals Rin and Sin, respectively, in order to estimate the initial delay on the echo path, to estimate an effective tap length, or effective filter length, of the adaptive filter 21.

Each time a voice signal comes in from a distal end, the delay and adaptive filter length estimator 20 calculates the initial delay on the echo path and the effective tap length of the adaptive filter 21. It is thus possible to determine at all times the initial delay on the correct echo path and the estimated echo path.

The adaptive filter 21 has its overall tap length, or filter length, set beforehand. The adaptive filter 21 is arranged to receive the estimated tap length from the delay and adaptive filter length estimator 20 to operate as an adaptive filter having that tap length.

Figure 7:
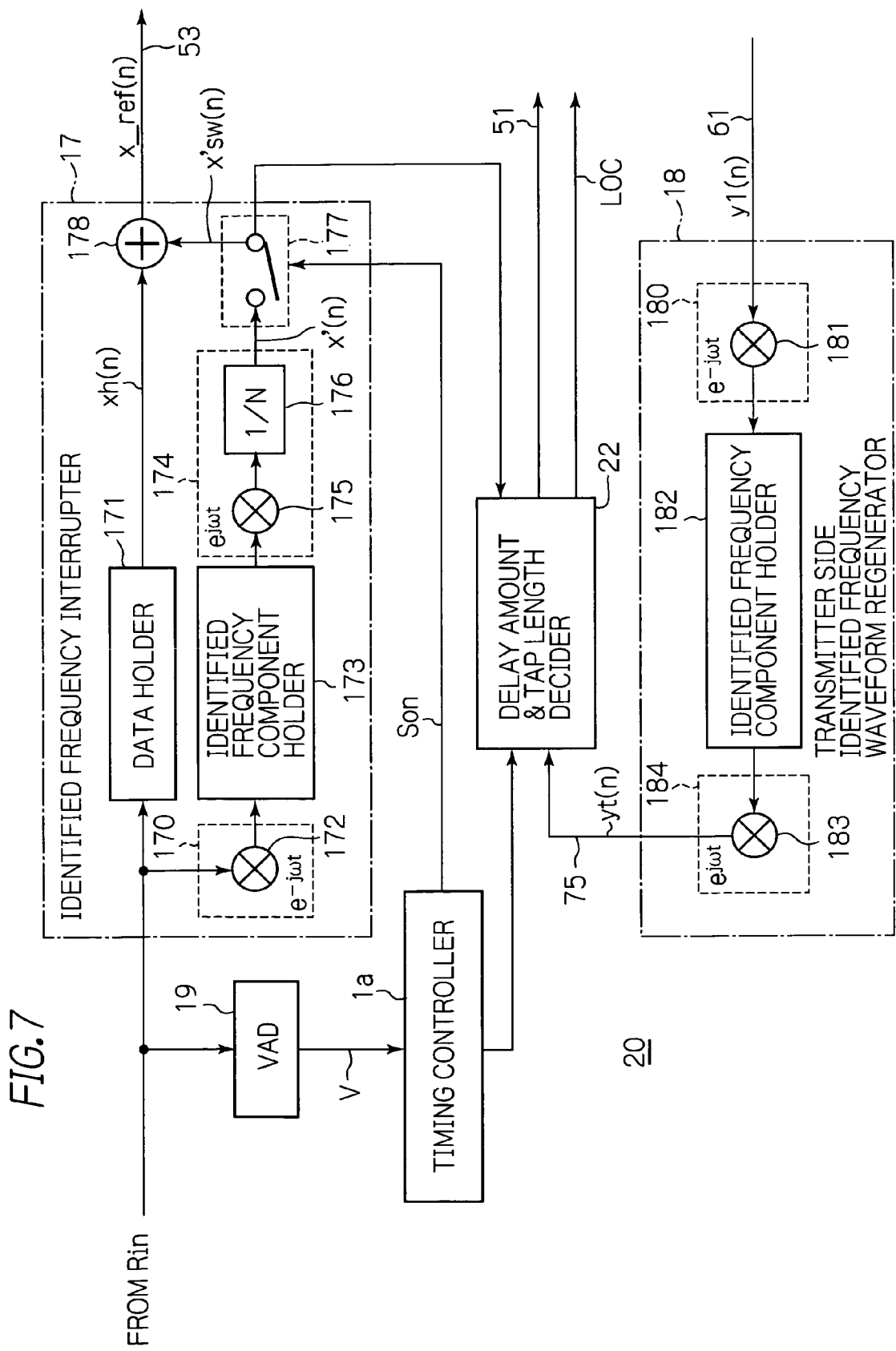
FIG. 7 is a schematic block diagram, like FIG. 3, showing the inner configuration of the delay and adaptive filter length estimator shown in FIG. 6.

FIG. 7 shows the inner configuration of the delay and adaptive filter length estimator 20 of the alternative embodiment. The delay and adaptive filter length estimator 20 of the alternative embodiment may be the same as the initial delay estimator 4 of the illustrative embodiment shown in FIG. 3 except for including a delay amount and tap length decider 22 in place of the delay amount decider 1b.

Figure 3:
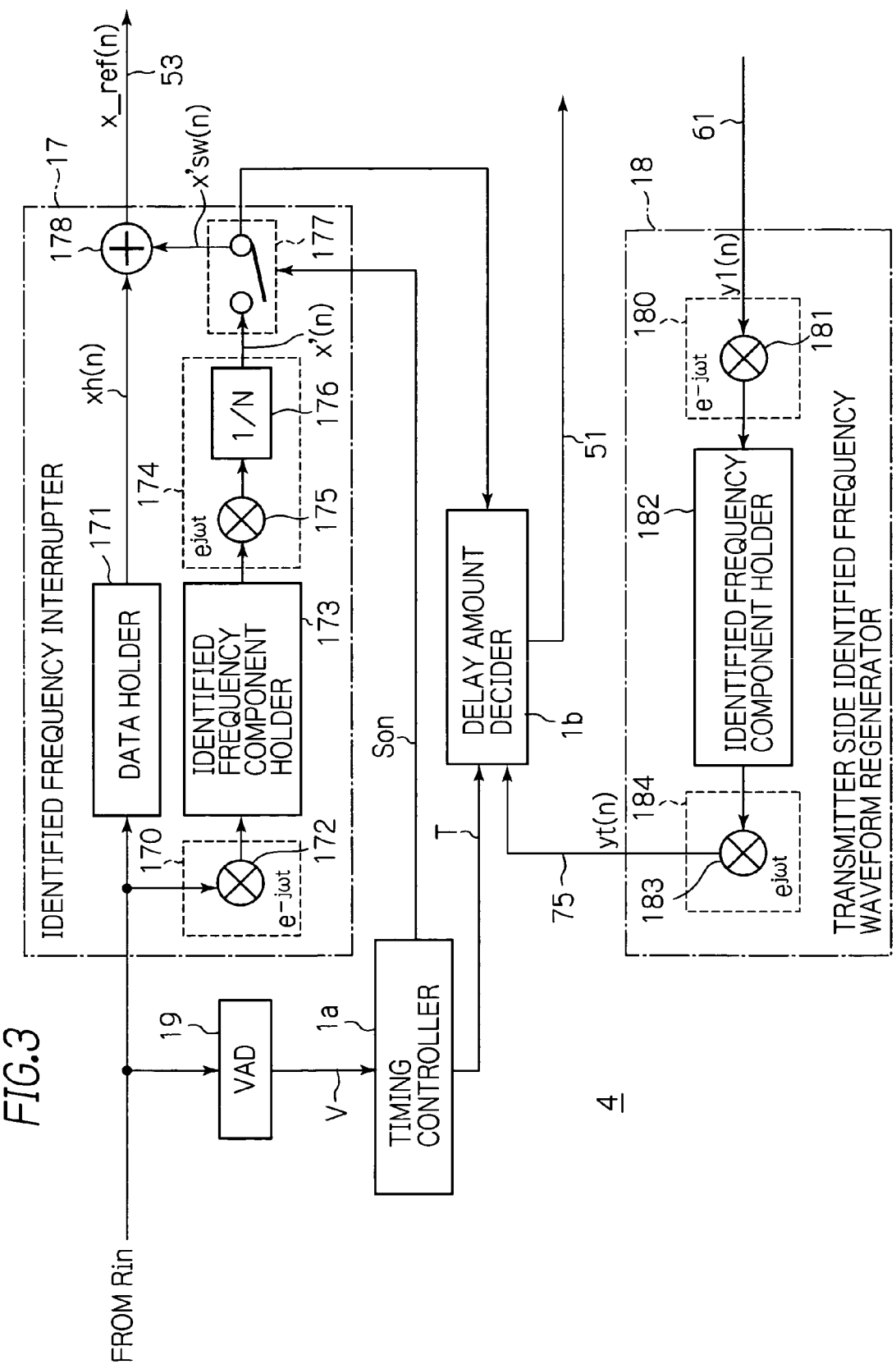
FIG. 3 is a schematic block diagram showing the inner configuration of the initial delay estimator shown in FIG. 1.

The delay amount and tap length decider 22 is adapted to estimate the initial delay on the echo path in a similar way to the illustrative embodiment shown in FIG. 3, as well as to determine the effective filter length, or tap length, of the adaptive filter covering the echo scattering time on the basis of both the timing of generating the delay estimation reference signal or reducing the component of the delay estimation reference signal and the initial delay already estimated to provide this filter length to the adaptive filter 21.

Next, the operation of the echo canceller of the alternative embodiment will be described with reference to the drawings. The alternative embodiment differs from the embodiment shown in FIGS. 1 and 3 in operation of the delay amount and tap length decider 22 included in the delay and adaptive filter length estimator 20. Accordingly, the following description is centered about the processing operations of the delay and adaptive filter length estimator 20.

Referring to FIG. 6, the delay and adaptive filter length estimator 20 estimates the initial delay on the echo path in a manner similar to the embodiment shown in FIG. 1. The estimator supplies the estimated delay amount Tid' to the delay circuit 2.

The delay and adaptive filter length estimator 20 calculates the tap length of the adaptive filter 21, i.e. its effective filter length, and provides the adaptive filter 21 with the calculated tap length.

Figure 8:
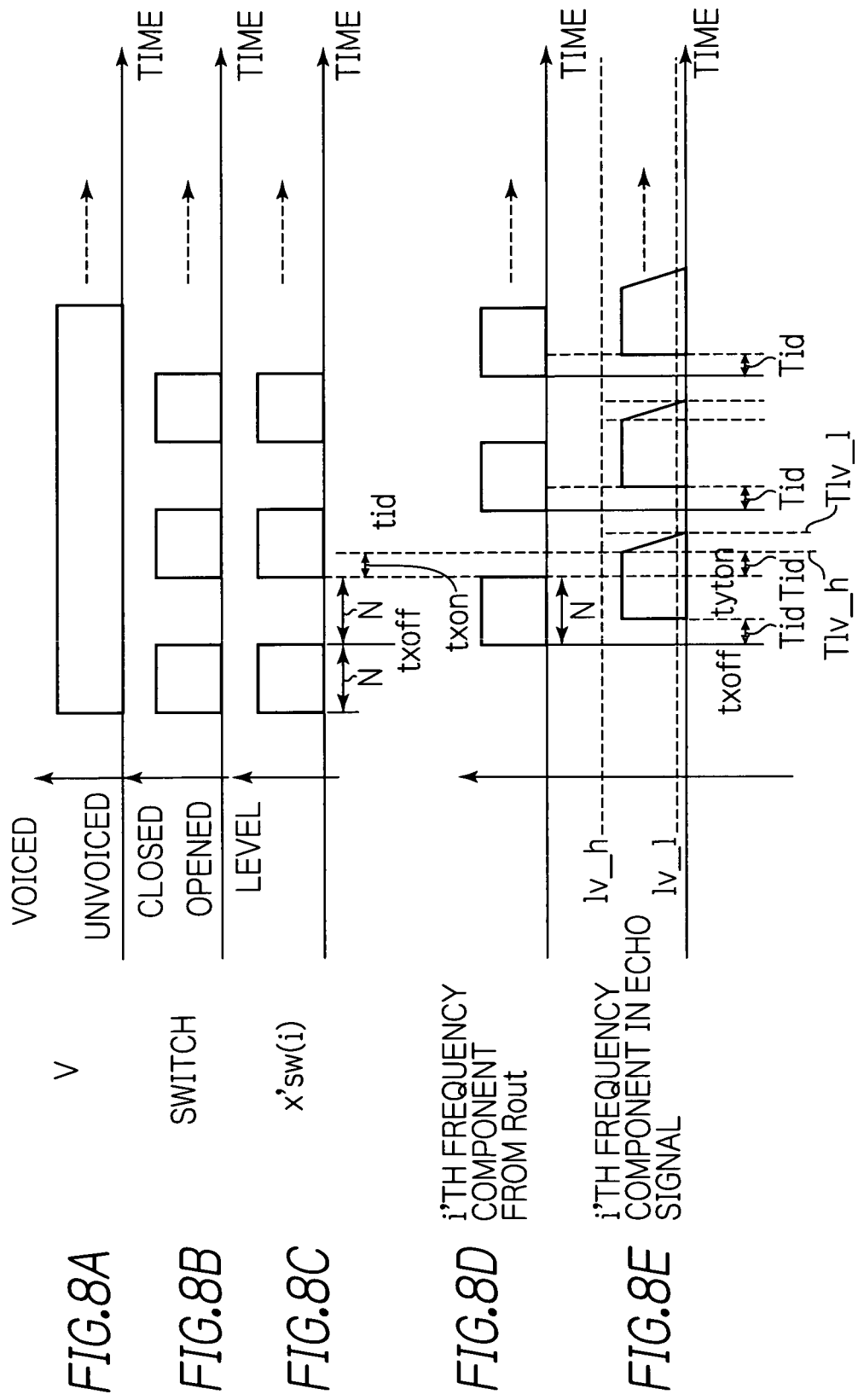
FIG. 8 is a timing chart, like FIG. 5, useful for understanding the tap length estimated by the delay and adaptive filter length estimator shown in FIG. 7.

In the following, the processing for estimating the tap length by the delay and adaptive filter length estimator 20 will be described. FIG. 8 is a timing chart useful for understanding the tap length estimation. In the figure, the first line (A) depicts the sound detection signal V produced by the voice activity detector 19, the second line (B) shows the timing for opening and closing the switch 177 and the third line (C) shows the level of the signal x' sw(n) inputted to the pure tonal component canceling adder 178. The fourth line (D) shows the level of the i'th frequency component included in the voice signal outputted from the terminal Rout and the fifth line (E) shows the level of the i'th frequency component included in the echo signal.

Continuing to refer to FIG. 8, when the time point txoff is detected, the delay amount and tap length decider 22 calculates, as shown in the line (C), the signal level of the i'th frequency component extracted from the echo signal after the time txon at which the switch 177 closes.

A variety of methods may be applied to calculating this signal level. For example, such a method may be applied that calculates the average value of absolute values of input samples. Alternatively, another method may also be applied that calculates the smoothed level by a recursive formula that uses a smoothing constant as described in connection with the voice activity detector 19.

The delay amount and tap length decider 22 calculates and holds the signal level lv_h of the i'th frequency component in the period from the time txon until the time of samples equivalent to the time Tid', see the line (E).

The delay amount and tap length decider 22 then finds a time Tiv_h when the time of samples equivalent to the Tid' is elapsed from the time txon. The delay amount and tap length decider 22 also detects a time point Tlv_l, at which the level of the echo signal falls from the level calculated during a time interval from the time point txon until Tlv_h to a value of tap length terminal point level lv_l that satisfies the expression (10):

$$\text{threshold value} = 20 \cdot \log(lv\_l/lv\_h) \tag{10}$$

In the alternative embodiment, the threshold value of the expression (10) is set to −40 dB, only in a non-limiting way.

In accordance with the expression (10), it is possible to decide a time point when the level lv_l falls by the threshold value, or 40 dB, from the level lv_h. That is, the level lv_l indicates that, with reference to FIG. 4, the initial delay portion of the echo path has come to a close and reaches the scatter response portion Tds, and further the major portion of the scatter response, e.g. the portion equivalent to 40 dB, has come to a close.

The delay amount and tap length decider 22 then calculates the effective tap length LOC on the basis of the time difference between the Tlv_h and Tlv_l or the sample difference between both the numbers of the respective, corresponding samples, in accordance with the expression (11):

$$LOC = Tlv\_l - Tlv\_h \tag{11}$$

The result is outputted to the adaptive filter 21.

The adaptive filter 21, when having received the filter length LOC, uses such part of the overall filter length L designed beforehand with a certain margin which corresponds to the inputted tap length LOC to perform an adaptive filtering operation under the NLMS algorithm mentioned above, thereby producing the pseudo echo signal y' (n).

In the alternative embodiment, the overall filter length L is set to 512, only in a non-restrictive way. Hence, the selectable filter length LOC may be set against the overall filter length L by the expression (12):

$$LOC \leq L \tag{12}$$

If the length LOC calculated by the expression (11) exceeds the length L, then the length LOC is limitatively reduced to the maximum value, i.e. the overall filter length L, which will subsequently be outputted to the adaptive filter 21. The adaptive filter 21 then operates as an adaptive filter with its tap length equal to the value L to cancel out the echo accordingly.

In short, in accordance with the alternative embodiment, in addition to the advantages of the embodiment shown in FIGS. 1 and 3, it is advantageously possible to estimate the effective tap length of the adaptive filter 21 by the delay amount and tap length decider 22. Furthermore, since the adaptive filter produces a pseudo echo signal by using an estimated tap length within the overall filter length, it is also advantageously possible to effectively utilize the taps of the adaptive filter 21, thereby properly reducing the filter length.

Moreover, in the alternative embodiment, when applied to an acoustic canceller for a hands-free talk device, for example, it is possible to successfully cope with causes for fluctuation that might occur on an echo path in practice. Specifically, in consideration of the shorter tap length of the adaptive filter 21 bringing the higher rate of convergence, the taps corresponding to the pure delay Tid are compensated for by the delay amount and tap length decider 22 with the effective components of the echo scatter time Tds are maintained by the adaptive filter 21 to the allowable least extent, thereby advantageously removing the echo.

In addition, in accordance with the alternative embodiment, in case the initial delay on the echo path has changed, or the scatter response portion on the echo path has changed by incidental movements of the body of a proximal-end speaker, the echo canceller may follow up the echo cancellation at a higher speed with the cost for calculation suppressed lower. Accordingly, such an echo canceller may be achieved that has a sufficient echo cancellation performance despite only lower power consumption.

Now, another alternative embodiment of the echo canceller of the present invention will be described with reference to FIG. 10. The illustrative embodiments described above have the frequency processed by the echo canceller restricted to the frequency usable for time-to-frequency transform or frequency-to-time transform. In practice, however, distal-end talkers are various in voice quality, that is, in voice frequency component. That fact possibly reads to the delay estimation reference signal x_ref(n), when prepared by performing time-to-frequency or frequency-to-time transform with a predetermined fixed value of frequency, not optimally falling in the range of frequency component maskable of the voice signal of an actual distal-end talker. Thus, the other alternative embodiment is arranged so that the frequency for use in time-to-frequency or frequency-to-time transform may adaptively be set in order to successfully cope with the above mentioned problem.

Figure 9:
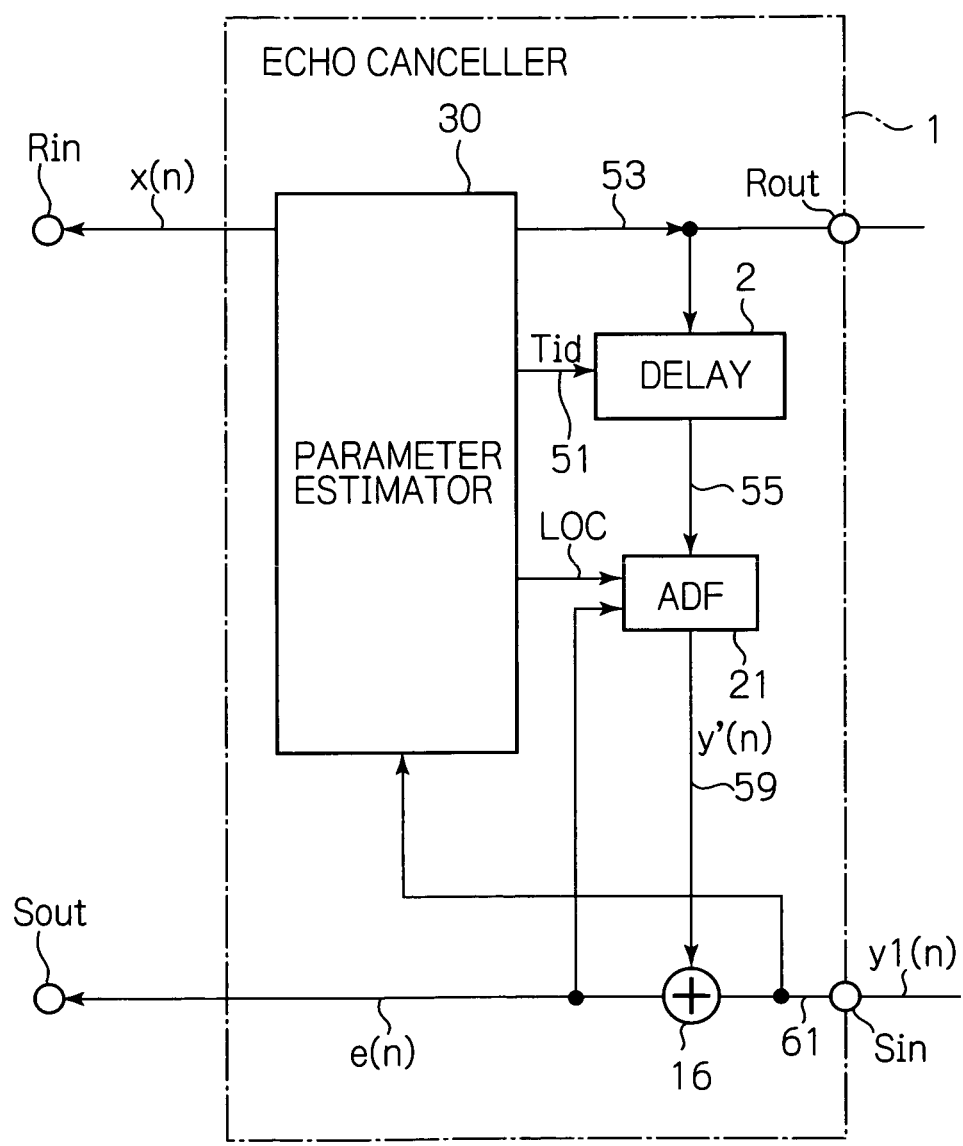
FIG. 9 is a schematic block diagram, like FIG. 6, showing the configuration of an echo canceller in accordance with another alternative embodiment of the present invention.

FIG. 9 is a schematic block diagram showing the configuration of an echo canceller of the instant alternative embodiment. The alternative embodiment may be the same as the alternative embodiment shown in and described with reference to FIGS. 6 and 7 except for including a parameter estimator 30 in place of the delay and adaptive filter length estimator 20. The terminals Rout and Sin are interconnected to the voice output driver 4 and the voice input driver 15, FIG. 1, respectively.

Figure 10:
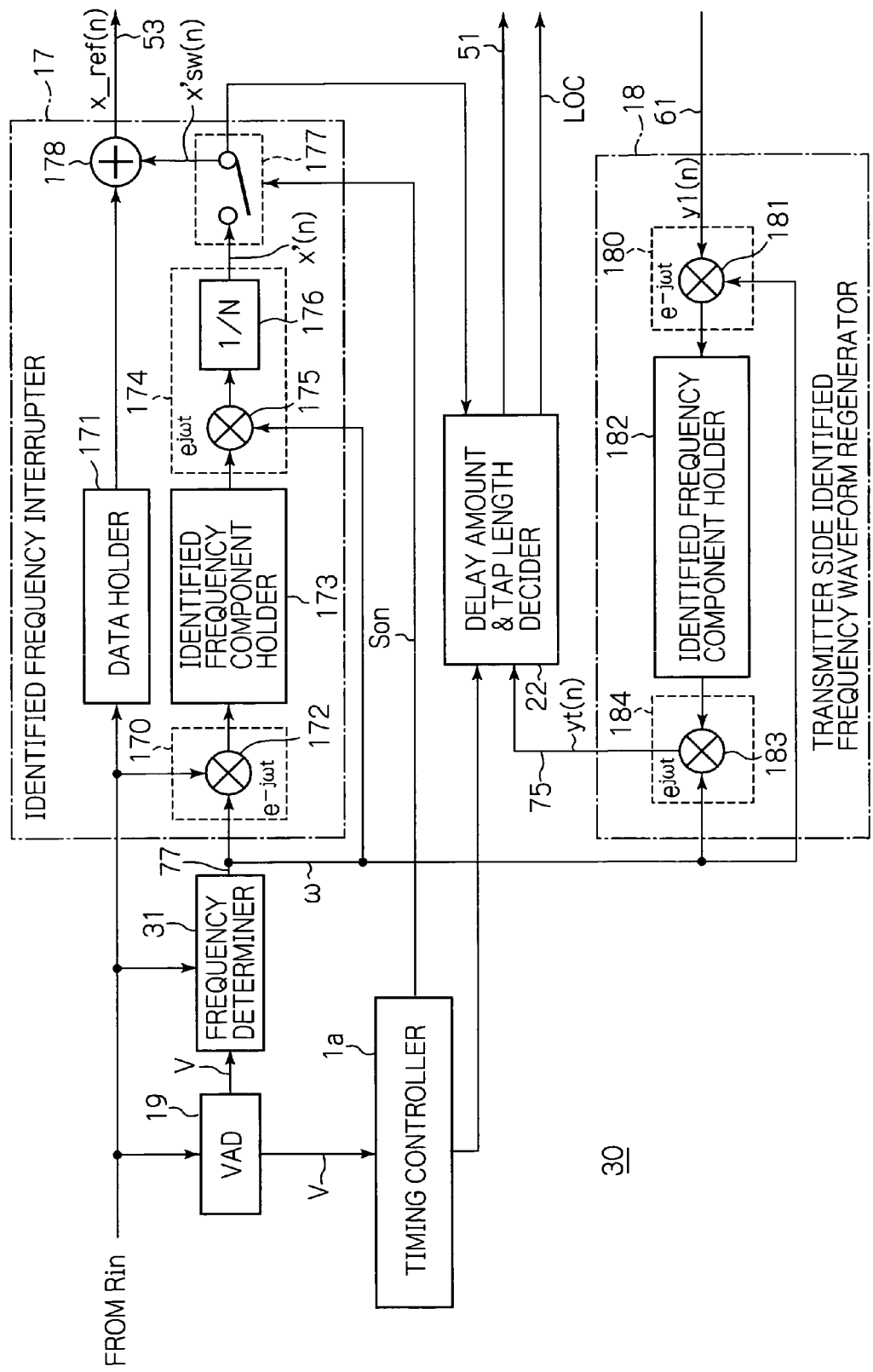
FIG. 10 is a schematic block diagram, like FIG. 3, showing the inner configuration of the parameter estimator shown in FIG. 9.

FIG. 10 depicts the inner configuration of the parameter estimator 30 of the instant alternative embodiment. The inner configuration of the parameter estimator 30 may be the same as the delay and adaptive filter length estimator 20, FIG. 7, except for additionally including a frequency determiner 31 interconnected as shown. The remaining constituent elements may be the same as the above embodiments and hence a repetitive description of those elements is here dispensed with.

The frequency determiner 31 functions as being responsive to the signal x(n) from the terminal Rin and the voice detection signal V from the voice activity detector 19 to determine an identified frequency f1 which will be described below. The frequency determiner 31 also functions as calculating the angular velocity ω of the identified frequency f1 by a method for calculation as later described to provide on its output 77 the calculated angular velocity to the receiver side DFT circuit 172, receiver side inverse DFT circuit 175, transmitter side DFT circuit 181 and transmitter side inverse DFT circuit 183.

Next, the operation of the echo canceller of the instant alternative embodiment will be described. The following description will be centered about the operation of the frequency determiner 31 of the parameter estimator 30 because the other constituent elements may operate in the same manner as the illustrative embodiments described above, and hence a repetitive description on such operation is here dispensed with.

The frequency determiner 31 receives the voice signal detection signal V from the voice activity detector 19. The frequency determiner 31 calculates the frequency f1 having the highest frequency component of the inputted distal end voice signal.

To calculating the frequency signal f1, a variety of methods may be applied. For example, the method disclosed in the '461 publication stated in the introductory part of the specification may be applied. With this known method, the component highest in power may be calculated from the input signal.

Meanwhile, in the '461 publication, the frequency component f1 having the highest power in the input signal is detected, and it is then estimated whether or not the detected frequency component f1 corresponds to either a call control signal or a facsimile signal. However, with the instant alternative embodiment, it is sufficient that the frequency component f1 can be detected, that is, it is unnecessary to estimate which sort of signal the frequency component f1 is.

After detecting the frequency component f1, the frequency determiner 31 determines the angular velocity ω in accordance with the expression (13):

$$\omega = 2\pi f1 + \Delta\omega \tag{13}$$

In the instant alternative embodiment, in order that the reference signal frequency will be produced in a critical frequency band which displays the advantage of the frequency masking effect as disclosed in "Section 5.5 Critical Bandwidth" of the Ono Sokki Technical Report stated earlier, the value of the member $\Delta\omega$ of the expression (13) is set so as to satisfy the relation of Δω=0.15ω (rad/sec). However, this is merely illustrative and not to be interpreted in a restrictive way.

It is noted that, for validity of the frequency masking effect, the value of Δω is preferably positioned as indicated by the expression (14):

$$0 < \Delta\omega \leq 0.2\omega \qquad (14)$$

The frequency determiner 31 is primed only for a period of time in which the voice detection signal V indicating the presence of voice is received from the voice activity detector 19 and a period T_hold following that period of time to deliver the angular velocity ω calculated by the expression (13) to the receiver side DFT circuit 172, the receiver side inverse DFT circuit 175, the transmitter side DFT circuit 181 and the transmitter side inverse DFT circuit 183. The period T_hold is provided in consideration that the echo signal is delayed on the echo path before supplied to the transmitter side. In the present alternative embodiment, T_hold is set to 0.5 seconds, but is not to be limited to this value. Thus, the angular velocity ω is outputted from the frequency determiner 31 for a time duration corresponding to the voice detection period plus T_hold.

The receiver side. DFT circuit 172 and the transmitter side DFT circuit 181 perform time-to-frequency transform by means of digital Fourier transform with the angular velocity ω, while the receiver side inverse DFT circuit 175 and the transmitter side inverse DFT circuit 183 perform frequency-to-time transform by means of inverse digital Fourier transform with the angular velocity ω, as previously mentioned. The manner of transform may be the same as already described in connection with the embodiment shown in FIG. 3 and hence is not here described again.

In summary, in accordance with the current alternative embodiment, in addition to the advantages of the embodiments described above, it is advantageously possible to adaptively set frequencies for use in time-to-frequency and frequency-to-time transforms. Accordingly, the optimum value of the angular velocity ω may automatically be set without relying upon the initial setting of the system by the user having knowledge or experience concerning the selection of the angular velocity ω.

Therefore, the initial delay on the echo path as well as the filter length of the adaptive filter may optimally be estimated. There may thus be provided an echo canceller that may track or follow changes in the initial delay on the echo path or in the scatter response.

In the illustrative embodiments described above, in order to calculate and detect txoff, a level detection is made on the point of an abrupt drop in level of a tone signal for cancellation. Alternatively, a direct use may be made of the time at which the switch 177 goes OFF responsive to the timing controller 1a. In this case, from the receiver side, the processing of level calculation and detection of the point of descent of x' sw(i) by long-term and short-term averaging may be omitted, thereby further reducing the sizes of the system and software.

In the alternative embodiment shown in and described with reference to FIGS. 9 and 10, the frequency determiner is provided in the section corresponding to the delay and adaptive filter length estimator of the embodiment shown in FIG. 6. Similar favorable effects may also be obtained by providing the frequency determiner in the initial delay estimator of the embodiment shown in FIG. 1.

The entire disclosure of Japanese patent application No. 2009-049665 filed on Mar. 3, 2009, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An echo canceller comprising:
    a pseudo echo generator including an adaptive filter for generating a pseudo echo signal on a basis of a received voice signal;
    an echo canceling circuit for subtracting the pseudo echo signal from a sending voice signal to thereby remove the echo signal from the sending voice signal;
    an initial delay estimator for producing a reference signal containing an identified frequency component masked by means of a frequency masking effect to output the reference signal to an echo path, and detecting, from the sending voice signal, an echo component of the identified frequency component derived from the reference signal to find an initial delay amount on the echo path on the basis of a producing timing of the reference signal containing the identified frequency component and a detection timing of the echo component in the identified frequency component in the sending voice signal; and
    a delay circuit for delaying the received voice signal by the initial delay amount on the echo path to supply a resulting signal to said pseudo echo generator.

2. The echo canceller in accordance with claim 1, wherein said initial delay estimator intermittently removes the identified frequency component from the received voice signal to thereby produce the reference signal containing the identified frequency component.

3. The echo canceller in accordance with claim 1, wherein said initial delay estimator comprises:
    an identified frequency interrupter including
        a receiver side digital Fourier transform circuit that performs digital Fourier transform on at least one frequency component of the received voice signal,
        a receiver side frequency component holder that holds a frequency component digital Fourier transformed,
        a receiver side inverse digital Fourier transform circuit that performs inverse digital Fourier transform on at least one frequency component of data held by said receiver side frequency component holder,
        a received voice signal holder that holds the received voice signal, and
        a frequency component remover for intermittently removing, from the received voice signal outputted from said received voice signal holder, the frequency components outputted from said receiver side inverse digital Fourier transform circuit;
    an identified frequency waveform regenerator including
        a transmitter side digital Fourier transform circuit that performs digital Fourier transform on at least one frequency component of the sending voice signal,
        a transmitter side frequency component holder that holds frequency components resulting from digital Fourier transform, and
        a transmitter side inverse digital Fourier transform circuit that performs inverse digital Fourier transform on at least one frequency component of data held by said transmitter side frequency component holder; and
    a delay amount decider finding the initial delay amount on the echo path on the basis of a time difference between time points of abrupt change in power or level of an output signal of said identified frequency interrupter and an output signal of said identified frequency waveform regenerator.

4. The echo canceller in accordance with claim 3, wherein said delay amount decider takes, as the initial delay amount on the echo path, a difference between a time point of abrupt descent in power or level of the output signal of said identified frequency interrupter when the identified frequency component is removed and a time point of abrupt ascent of power or level of the identified frequency component of the output signal of said identified frequency regenerator.

5. The echo canceller in accordance with claim 3, further comprising a switch provided between said receiver side inverse digital Fourier transform circuit and said frequency component remover for selecting connection paths in response to a result of detection of voice detected from the received voice signal, said delay amount decider taking a difference between a time point of switching by said switch and a time point of abrupt ascent in power or level of the identified frequency component of an output signal of said identified frequency regenerator as the initial delay amount on the echo path.

6. The echo canceller in accordance with claim 1, further comprising a filter length estimator for determining an effective filter length of said adaptive filter on the basis of the producing timing of the reference signal including the identified frequency component in said initial delay estimator and the initial delay amount on the echo path determined by said initial delay estimator.

7. The echo canceller in accordance with claim 1, further comprising a frequency determiner that finds a frequency having a higher power or level from the received voice signal and that uses the found frequency to determine the identified frequency in said identified frequency interrupter.

8. The echo canceller in accordance with claim 2, further comprising a frequency determiner that finds a frequency having a higher power or level from the received voice signal and that uses the found frequency to determine the identified frequency in said identified frequency interrupter.

9. The echo canceller in accordance with claim 3, further comprising a frequency determiner that finds a frequency having a higher power or level from the received voice signal and that uses the found frequency to determine the identified frequency in said identified frequency interrupter.

10. The echo canceller in accordance with claim 9, wherein said frequency determiner finds an angular velocity $\omega$ shifted by an angular velocity $\Delta\omega$ with respect to a frequency high in power or level found from the received voice signal, and feeds the angular velocity $\omega$ to said receiver side digital Fourier transform circuit, said receiver side inverse digital Fourier transform circuit, said transmitter side digital Fourier transform circuit and said transmitter side inverse digital Fourier transform circuit.

11. The echo canceller in accordance with claim 9, wherein said frequency determiner uses the angular velocity $\Delta\omega$ in a range of $0<\Delta\omega\leqq0.2\omega$.

12. The echo canceller in accordance with claim 9, wherein said frequency determiner shifts the frequency higher in power or level found from the received voice signal towards a higher frequency.

* * * * *